A. B. CAMDEN.
EXPANSIBLE BOLT.
APPLICATION FILED AUG. 7, 1915.
1,202,159.
Patented Oct. 24, 1916.
2 SHEETS—SHEET 1.
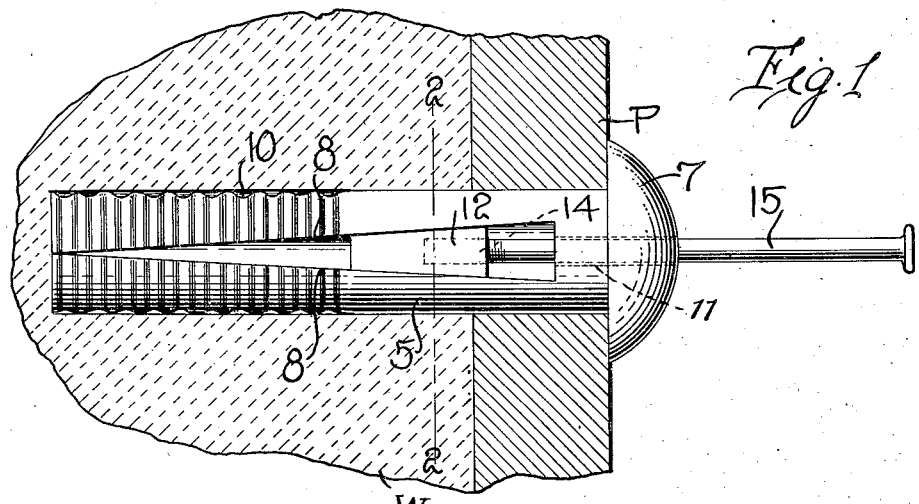
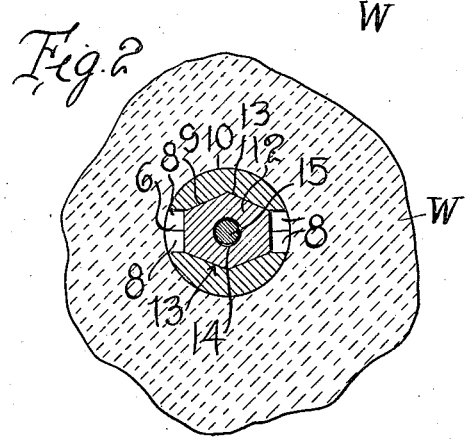
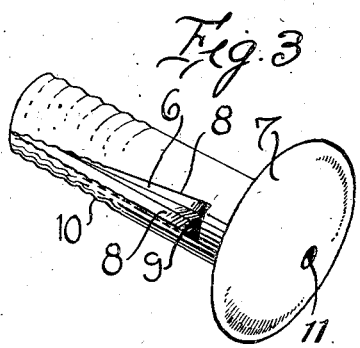
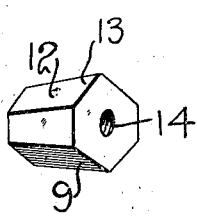
Inventor
A. B. CAMDEN
By Watson E. Coleman
Attorney

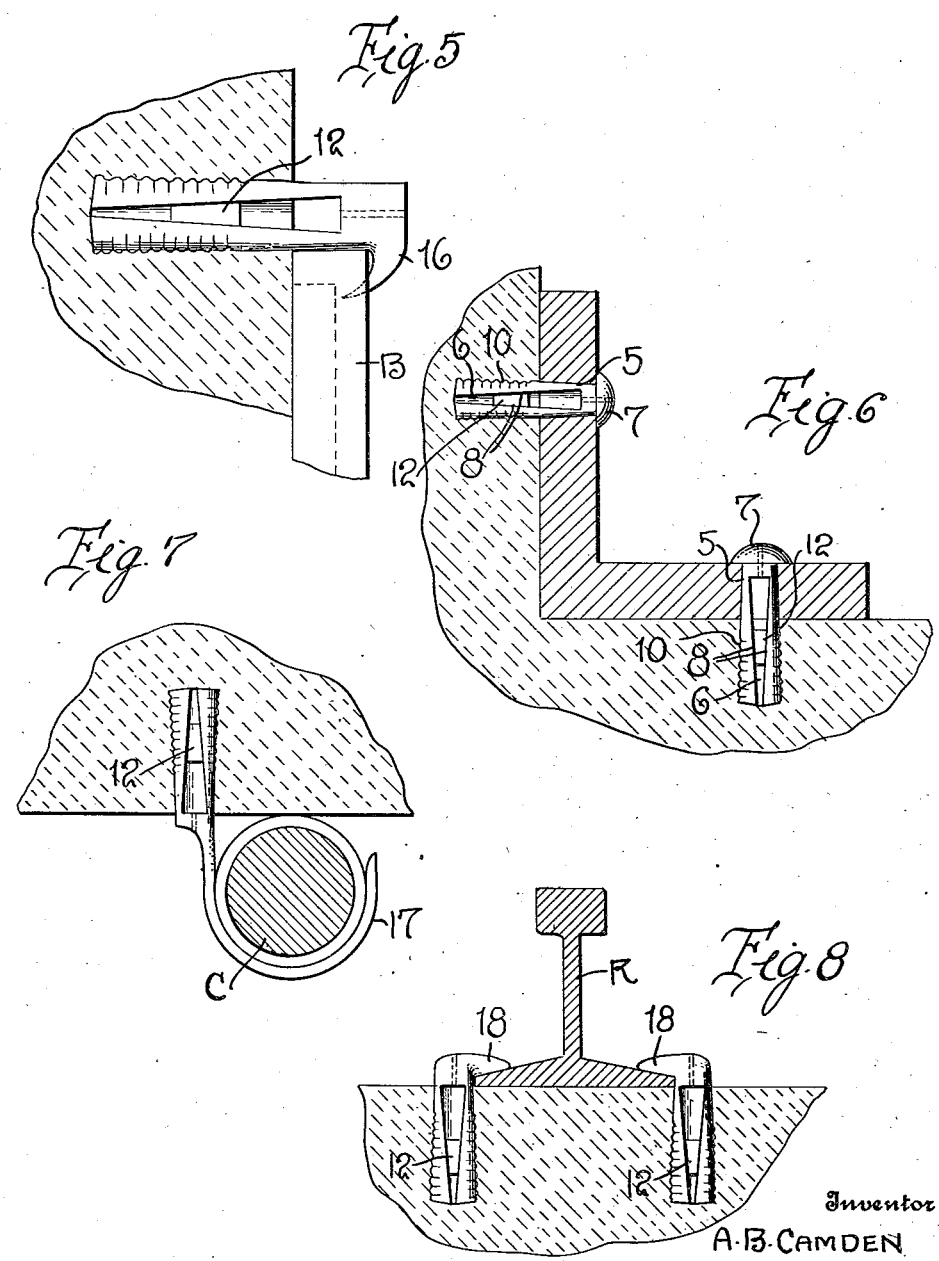

UNITED STATES PATENT OFFICE.

ANDREW B. CAMDEN, OF IDABEL, OKLAHOMA, ASSIGNOR OF ONE-HALF TO HENRY GRADY ROSS, OF IDABEL, OKLAHOMA.

EXPANSIBLE BOLT.

1,202,159.  Specification of Letters Patent.  Patented Oct. 24, 1916.

Application filed August 7, 1915. Serial No. 44,260.

*To all whom it may concern:*

Be it known that I, ANDREW B. CAMDEN, a citizen of the United States, residing at Idabel, in the county of McCurtain and State of Oklahoma, have invented certain new and useful Improvements in Expansible Bolts, of which the following is a specification, reference being had to the accompanying drawings.

This invention relates to expansible bolts and analogous fasteners and has for its primary object to provide a device of this character embodying a bolt having a split shank in conjunction with which a separable wedging element is adapted to be employed, said bolt having an opening through its head portion through which a driving pin may be inserted to operate upon the wedging element and expand the split portions of the bolt shank.

It is an additional object of my invention to provide an expansible fastening member which may be advantageously employed for a variety of purposes and will anchor the bolt, spike, or other member with absolute security in a wall or other structure.

It is an additional object of my invention to provide a device of the above character which is exceedingly durable in its construction, simple and inexpensive to manufacture, and very reliable and effective in practical use.

With the above and other objects in view, my invention consists in the novel features of construction, combination, and arrangement of parts to be hereinafter more fully described, claimed and illustrated in the accompanying drawings, in which, Figure 1 is a section through a building wall, showing a plate or other object secured to the face thereof by means of my improved expansible fastener; Fig. 2 is a section taken on the line 2—2 of Fig. 1; Fig. 3 is a perspective view of the expansible bolt; Fig. 4 is a similar view of the wedge block; and Figs. 5, 6, 7 and 8 are views illustrating various uses of the invention.

Referring in detail to the drawings and more particularly to Figs. 1 to 4 thereof, 5 designates the shank of a bolt of requisite diameter for the particular purpose for which the bolt is to be employed. This shank is longitudinally split, as at 6, from one end thereof to a point adjacent to the head 7. The bolt head may be of any desired form. The inner opposed faces of the portions of the split shank 5 are longitudinally and convergently inclined, as at 8, from the inner end of the split 6 to the extremity of the shank. These opposed faces 8 meet and contact with each other at the end of the shank, as clearly shown in Fig. 1. The opposed walls 8 of the split shank are centrally formed with the shallow longitudinally extending grooves or channels 9, the purpose of which will be later explained. The outer peripheral surface of each portion of the split shank has a series of annular corrugations 10 formed therein.

Through the head 7 of the bolt and the contiguous split shank portion thereof, an axial bore or opening 11 is formed, which communicates at its inner end with the space between the split portion of the shank.

In conjunction with the split bolt shank, I employ a metal wedge block 12 which tapers longitudinally, as shown in Fig. 1. The upper and lower surfaces of this block are inclined or beveled from the opposite edges of the block upwardly and inwardly to the center thereof to produce the ridges 13 thereon which are adapted to slidingly fit into the grooves or channels 9 in the opposed faces of the separated or split portions of the bolt shank. This wedge block is adapted to be fitted into place between the inner spaced ends of the split portions of the shank with its larger or thicker end facing the bore 11. This large end of the wedge block is provided with a central threaded socket 14 to receive the threaded end of a detachable rod or pin 15.

In the use of my invention as shown in Fig. 1, W designates a building wall upon the face of which a plate or slab P is to be secured or fastened by means of my invention. The plate is, of course, provided with an opening and the wall W with a circular socket designed to receive the split shank of the bolt 5. Before inserting the bolt shank, the wedge block 12 is arranged in position between the opposed faces of the split portions of the shank at their inner ends. After the bolt has been inserted, the rod or pin 15 is then inserted into the bore or opening 11 and its extremity threaded in the socket 14 of the wedge block. By means of a suitable hammer, several blows are delivered against the outer end of the pin 15, thereby driving the wedge block 12 toward the engaged ends of the split portions of the bolt shank and forcing said split portions apart so that their corrugated faces 10 will securely grip and bite into the opposed walls of the hole or socket in which the bolt is disposed. The wedge block which is guided in its longitudinal movement by the V-shaped grooves or channels 9, is held against any transverse shifting movement with respect to the shank of the bolt. After the wedge block has been thus driven to its locking position between the split portions of the shank, the rod or pin 15 is turned and disconnected from the wedge block, when it may be withdrawn from the bore or opening 11 in the head of the bolt. I preferably provide the wedge block with the threaded socket 14 to receive the driving pin or rod, as it provides convenient means whereby the rod may be positively connected to the block when it is desired to withdraw or remove the bolt. By simply connecting the pin to the block and prying outwardly upon the pin by means of a wrench or other suitable tool, the wedge block can be moved to its released position and into the wider end of the longitudinal split in the bolt shank. It is, however, to be understood that, if desired, the provision of the threaded socket in the end of the wedge block may be eliminated when the bolt shank or other fastening element is to remain permanently in place. As the provision of this threaded socket, however, is a very small item of expense in the manufacture of the device, I deem it preferable to form the wedge blocks in this manner.

In Fig. 5 of the drawings, I have illustrated another use for my invention. In this construction, the spike or bolt shank may be either of cylindrical or rectangular cross-sectional form and the outer end or head thereof is provided with a curved spur or hook 16 which is adapted to engage over the flange or bead on the frame of a sign board, indicated at B. My improved expansible fastener provides means for securely holding the sign board against the face of a building wall so that the same cannot be blown down by high winds or dislodged and released by other causes.

In Fig. 6 of the drawings, I have shown my improved fasteners or bolts employed for securing braces or other fastening irons to concrete floors, which are usually employed for fastening chairs, motors, and various machines in place. The fasteners are identical in construction with that which I have above described in detail.

In Fig. 7 of the drawings, there is shown an application of my invention to a hanger for cables, pipes, or conduits, to support the same in suspended relation from a beam or ceiling. In this case, the outer end of the longitudinally split shank, which is fixed in the beam or ceiling, is formed with a wide open hook 17 in which the pipe or conduit C is received and supported.

In Fig. 8 of the drawings, I have shown my improved expansible fasteners in the form of spikes such as are employed for securing railroad rails upon the ties. The present invention is particularly advantageous for this purpose when the ties are of concrete construction. One end of the split shank of the spike is formed with a laterally extending lug or head 18 for engagement over the base flange of the rail R.

In each of the several illustrated uses of my invention above referred to, the construction of the bolt or spike shank and the means for expanding the opposed portions thereof, are identical.

From the foregoing description, taken in connection with the accompanying drawings, it will be seen that I have produced a very simple, efficient and reliable form of expansible fastener which can be easily and quickly arranged in position to secure an object in place and absolutely anchored in the wall or other base structure against accidental or casual displacement. It is, of course, obvious that the bolts or spikes may be constructed in various sizes and that the relative proportions of the several structural features thereof may be considerably varied in accordance with the particular use to which the device is to be applied. The invention is, therefore, obviously susceptible of considerable modification in the several features above referred to and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a base structure having a mortise therein and a part to be fastened upon said base structure, of an expansible bolt having a longitudinally split shank adapted to be engaged in said mortise and provided with means formed on one of its ends for engagement with the part to be fastened to retain the same upon the base structure, a longitudinally movable wedge arranged between the split portions of the shank, and said bolt shank at its latter end being provided with an opening through which a driving element may be inserted for temporary engagement with the wedge to move the same longitudinally and expand the split portions of the shank into binding engagement with the walls of the mortise.

2. The combination with a base structure having a mortise and a part to be fastened upon the base structure provided with an opening to coincide with said mortise, of an expansible bolt having a longitudinally split shank adapted to be engaged in the mortise and said opening, said shank being formed with a head on one end for engagement between the split portions of the shank, the headed end of said shank having a longitudinal bore, and a driving element adapted to be temporarily inserted through said bore and engaged with the wedge member to spread the split portions of the shank into clamping engagement with the walls of the mortise.

3. An expansible fastener having a shank longitudinally split from one end to a point adjacent its other end, the latter end of the shank having a bore formed therein, the opposed faces of the split portions of the shank converging toward each other and being normally engaged at the opposite end of the shank, a separable wedge member adapted to be arranged between the split portions of the shank, and a driving pin adapted to be inserted into the bore of the shank and positively but detachably connected to said wedge member to force the same toward the engaged ends of the split portions of the shank and spread or separate the split portions thereof.

4. An expansible fastener having a shank longitudinally split from one end to a point adjacent its other end, the opposed faces of said split portions of the shank being convergently disposed toward each other to the opposite end of the shank, said shank at the inner ends of the split portions being provided with a longitudinal bore, a separable longitudinally tapering wedge block adapted to be arranged between the split portions of the shank, and having a threaded socket in one end, and a driving pin adapted to be inserted into the bore of said shank and detachably engaged in the threaded socket in the wedge member to force said member to its wedging position and spread the split portions of the shank.

In witness whereof I hereunto affix my signature in the presence of two witnesses.

ANDREW B. CAMDEN.

Witnesses:
H. B. DRAKE,
C. R. O'NEAL.